(12) United States Patent
Grasso et al.

(10) Patent No.: US 9,124,362 B2
(45) Date of Patent: Sep. 1, 2015

(54) OPTICAL AMPLIFICATION STAGE FOR OTDR MONITORING AND RELATED METHOD AND SYSTEM FOR OTDR MONITORING OF AN OPTICAL COMMUNICATION LINK

(71) Applicant: PADTEC S.A., Campinas-SP (BR)

(72) Inventors: Giorgio Grasso, Monza (IT); Andrea Melloni, Milan (IT); Aldo Righetti, Milan (IT); Fausto Meli, Piacenza (IT)

(73) Assignee: PADTEC S.A., Campinas (BR)

( * ) Notice: Subject to any disclaimer, the term of this patent is extended or adjusted under 35 U.S.C. 154(b) by 22 days.

(21) Appl. No.: 14/049,866

(22) Filed: Oct. 9, 2013

(65) Prior Publication Data

US 2014/0105595 A1 Apr. 17, 2014

(30) Foreign Application Priority Data

Oct. 12, 2012 (EP) .................................... 12188260

(51) Int. Cl.
*H04B 10/071* (2013.01)
*H04B 10/291* (2013.01)
(52) U.S. Cl.
CPC .......... *H04B 10/071* (2013.01); *H04B 10/2918* (2013.01)
(58) Field of Classification Search
CPC .... H04B 10/07; H04B 10/071; H04B 10/073; H04B 10/0731; H04B 17/00; H04B 17/0082; H04B 17/085; H04B 17/087
See application file for complete search history.

(56) References Cited

U.S. PATENT DOCUMENTS

| 6,708,004 | B1 | 3/2004 | Homsey |
| 6,845,192 | B2 | 1/2005 | Yokoyama et al. |
| 6,868,204 | B2 | 3/2005 | Yokoyama et al. |
| 7,123,405 | B2 | 10/2006 | Yokoyama et al. |
| 7,388,657 | B2 | 6/2008 | Abbott |
| 7,496,296 | B2 | 2/2009 | Michishita |
| 7,872,738 | B2 | 1/2011 | Abbott |
| 2002/0044314 | A1 | 4/2002 | Michishita |
| 2002/0131696 | A1 | 9/2002 | Yokoyama et al. |
| 2004/0161191 | A1 | 8/2004 | Yokoyama et al. |
| 2004/0161244 | A1 | 8/2004 | Yokoyama et al. |
| 2007/0041006 | A1 | 2/2007 | Abbott |
| 2008/0309925 | A1 | 12/2008 | Abbott |
| 2009/0324249 | A1 | 12/2009 | Zhang |

FOREIGN PATENT DOCUMENTS

| EP | 1182806 A2 | 2/2002 |
| EP | 1246377 A2 | 10/2002 |
| EP | 1758279 A1 | 2/2007 |

*Primary Examiner* — Darren E Wolf
(74) *Attorney, Agent, or Firm* — Pearne & Gordon LLP

(57) ABSTRACT

Optical amplification stage (1) for OTDR monitoring, comprising a first (2a) and a second optical signal path (2b), a first (3a) and a second optical amplifier (3b), a first optical coupler (4a) placed along the first optical signal path downstream the first optical amplifier, a second optical coupler (4b) placed along the second optical signal path downstream the second optical amplifier, an optical by-pass path (5) optically connecting the first and the second optical coupler, a first (11a) and a second optical reflector (11b) optically connected to respectively the first and second optical coupler, and an optical filter (10) placed along the optical by-pass path which has attenuation high on the whole WDM band and low at the OTDR wavelength(s).

16 Claims, 3 Drawing Sheets

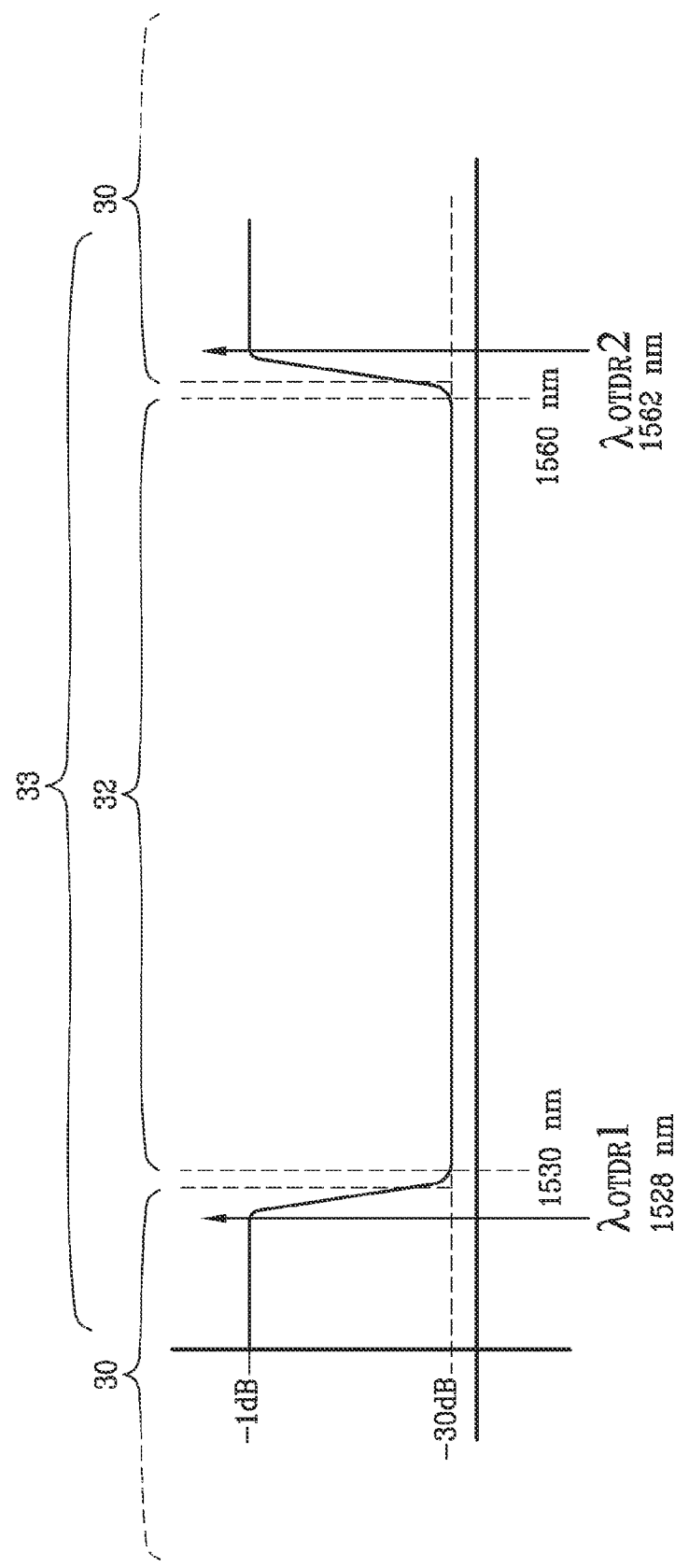

OPTICAL AMPLIFICATION STAGE FOR OTDR MONITORING AND RELATED METHOD AND SYSTEM FOR OTDR MONITORING OF AN OPTICAL COMMUNICATION LINK

FIELD OF THE INVENTION

The present invention relates to the field of optical telecommunication, in particular it relates to an optical amplification stage for OTDR monitoring and related method and system for OTDR monitoring of an optical communication link, in particular a bi-directional, amplified, optical communication link.

BACKGROUND OF THE INVENTION

Optical Time Domain Reflectometry (OTDR), and more particularly Coherent-OTDR (C-OTDR, e.g. having an OTDR signal based on a continuous wave shifted in frequency and received coherently), is a well known technique for monitoring optical communication link made up of optical fiber spans, in particular for monitoring amplified optical communication link wherein a number of optical amplifiers are cascaded along the optical communication link. For example, in submarine optical communication systems which may span over thousands of kilometers (up to 8-10.000 km) without opto-electronic (O/E) conversion of the WDM signal thanks to a cascade of various tens of WDM amplifiers regularly spaced, C-OTDR allows fast and accurate detection of optical link and/or optical amplifier failures. OTDR relies on the well know principle of the back-scattering of an optical radiation propagating along an optical fiber by the material of the optical fiber itself. Since the optical amplifiers allow propagation only in the direction of the WDM signal along an optical line (e.g. they typically include uni-directional optical isolator), it is needed to route the back-scattered OTDR radiation into a further optical line, co-spanning with the optical line under test, having opposite direction of propagation of the respective WDM signal. This task is usually accomplished by way of a by-pass path in correspondence of each optical amplifier. The Applicant has noted that a general problem of the state of the art OTDR techniques is that, in particular for long optically amplified system (e.g. over 2000 km without O/E conversion), due to the high loss of the C-OTDR bypass path (usually set at about 30 dB), needed for avoiding interference between data (WDM) channels propagating in opposite directions, it is necessary to launch OTDR signals with high power (typically higher than the power of the WDM channels) in order to monitor the integrity and the operation of the amplifiers and/or the lines. This in turns requires to perform the OTDR monitoring operations only out-of-service (i.e. with the WDM signal off), since otherwise the optical power in the OTDR signal would reduce the amplifier optical gain and then the dynamic range of the transmission system. US2009/0324249 A1 discloses various high loss loop back (HLLB) repeater architectures that enable selectively monitoring of Rayleigh signals from both inbound and outbound directions of an optical communication system. In one such embodiment (as shown in FIG. 3a of the cited document), the repeater includes an amplifier pair (amplifiers A and B), six optical couplers, and two wavelength selective filters each reflecting only the two test signal wavelengths from OTDR test equipment. A first HLLB path is provided for coupling the output of amplifier A to the input of amplifier B. A second HLLB path is provided for coupling the output of amplifier B to the input of amplifier A. A third HLLB path is provided for coupling the output of amplifier A to the output of amplifier B. When monitoring the incoming fiber, the two test signal wavelengths from OTDR equipment propagate through the first HLLB path and down the incoming fiber, and the corresponding reflected Rayleigh signal wavelengths from the incoming fiber are provided back to the OTDR test equipment for analysis. In addition to the Rayleigh signal it is also provided an HLLB test signal which is reflected by the filter along the first HLLB path and into port Y of coupler 6. This HLLB test signal is output at port A of coupler 6 and provided to the 10% port of coupler 2, and to the third HLLB path, and then back to OTDR equipment. This HLLB test signal can be used in a similar fashion as the OTDR test signals in diagnosing problems or potential problems associated with the HLLB architecture. The Applicant has noted that the total loss of the third HLLB path (which serves as a by-pass path) is only about 20 dB, resulting in an unacceptably high interference of the in-band back-scattered WDM signals coming from one optical line to the WDM signal of the other optical line, especially when a large number of optically amplified spans are cascaded together. The Applicant has also realized that, in an attempt to overcome the above interference problem, increasing the loss of the third HLLB path (e.g. up to 30 dB) would lead to the disadvantages noted above (need for high power OTDR signals).

SUMMARY OF THE INVENTION

It is an aim of the present invention to provide an optical amplification stage adapted for OTDR monitoring, as well as a related system and method for ODTR monitoring, which allows monitoring at least the status of operation of optical amplifiers along an amplified optical communication link (in particular the output optical power of the amplifiers), possibly in presence of the data-carrying WDM signal along the link under test (in-service monitoring), with a simple and effective architecture of the amplification stage which introduces negligible or no interference on the WDM signal.

In one aspect the present invention relates to an optical amplification stage for OTDR monitoring, the stage comprising a first and a second optical signal path having respectively first and second direction of propagation of a respective first and second optical signal, the first and second direction of propagation being mutually opposite, and a first and a second optical amplifier located along the first and second optical signal path respectively and having an optical amplification band.

In an aspect each of the first and second optical signal is a WDM signal comprising a plurality of optical signal channels having center wavelengths distributed on a grid equally spaced in frequency by a WDM spacing, the WDM signal occupying a WDM band comprised within the amplification band. The WDM band may be a single spectrally continuous (e.g. without 'holes' greater than one WDM spacing) band or a set of (e.g. typically but not necessarily two and no more than two) spectrally continuous sub-bands separate one from the other by more than one WDM spacing (e.g. each sub-band separated by at least 1 nm from the adjacent sub-band(s)). Preferably the WDM signal does not occupy the whole amplification band, and a first and second OTDR wavelengths fall (preferably on the grid) outside the WDM band and inside the amplification band. Preferably the WDM band is a single, spectrally continuous band and the first and second OTDR wavelengths are at the opposite sides of the WDM band. In an alternative embodiment, the WDM band consists of two spectrally continuous sub-bands separated by at least 1 nm, wherein at least one, preferably both, the first and second OTDR wavelengths are located between the two sub-bands. Preferably the distance of each of the first and second OTDR wavelength from the nearest edge of the WDM band (i.e. the nearest WDM wavelength allocated on the grid) is greater than or equal to 0.5 nm, more preferably greater than or equal to 1 nm and/or less than or equal to 6 nm, more preferably less than or equal to 3 nm, e.g. 2 nm. Preferably the distance among the first and second OTDR wavelengths is at least 200 GHz, preferably at least 1000 GHz.

Preferably, the total width of the WDM band is greater than or equal to 15 nm, more preferably greater than or equal to 20 nm, e.g. about 30 nm. Preferably, the width of the amplification band is greater than or equal to 20 nm, more preferably greater than or equal to 25 nm, e.g. 36 nm.

Preferably the WDM band and/or the amplification band is comprised in the infrared band from 1500 nm to 1620 nm, more preferably from 1510 nm to 1580 nm, still more preferably from 1520 nm to 1565 nm. Preferably the WDM spacing is less than or equal to 200 GHz, more preferably less than or equal to 150 GHZ, for example 100 GHz or 50 GHz. In an aspect the optical amplification stage comprises a first optical coupler placed along the first optical signal path downstream the first optical amplifier with respect to the first direction of propagation, a second optical coupler placed along the second optical signal path downstream the second optical amplifier with respect to the second direction of propagation and an optical by-pass path optically connecting the first and the second optical coupler. Conventionally each coupler has a first and second signal port belonging to the respective optical signal path, the first port facing the respective amplifier, and a first and second by-pass port, the first by-pass port belonging to the optical by-pass path, wherein the first by-pass port is the cross-port with respect to the second signal port. Preferably the optical couplers are directional optical couplers each one formed by a pair of optical fiber segments closely spaced together. In an aspect, the ratio of the optical power inputting each port of each coupler to the optical power outputting the respective cross port (e.g. from first signal port to second by-pass port) is greater than or equal to 7 dB, preferably greater than or equal to 8 dB, and/or less than or equal to 15 dB, preferably less than or equal to 13 dB, e.g. 10 dB (90/10 power splitting ratio).

In an aspect, the ratio of the optical power inputting each port of each coupler to the optical power outputting the respective thru-port (e.g. from first signal port to second signal port) is greater than 0 dB and/or less than 1.5 dB, preferably less than or equal to 1 dB, e.g. 0.5 dB (90/10 power splitting ratio).

In an aspect the optical power response of the first and second optical coupler is substantially constant (e.g. less than 1 dB variation) over the whole WDM band, typically over the whole amplification band.

In an aspect the optical amplification stage comprises a first and a second optical reflector optically connected to the second by-pass port of respectively the first and second optical coupler. Preferably the first and second reflector are placed on a respective optical fiber connected, preferably directly, i.e. without intervening couplers and/or other optical devices, to the second by-pass port of the respective optical coupler. In an aspect, the first and second reflectors are structured so that the optical power ratio of the optical radiation reflected by each optical reflector to the radiation incident thereto at the first and second OTDR wavelengths is less than or equal to −7 dB, preferably less than or equal to −10 dB, and/or greater than or equal to −20 dB, preferably greater than or equal to −16 dB. In such a way a portion (e.g. at least 50%) of the optical power of the WDM channels may pass through the reflectors for being detected downstream. On the other hand, it is mitigated or avoided the onset of multipath interference noise at the first and second OTDR wavelengths arising from the multiple reflections between the first and second reflectors (resonant cavity effect). Preferably the above defined optical power ratio is substantially constant over the whole WDM band, preferably over the whole amplification band (comprising the first and second OTDR wavelengths). In such a way the production tolerances of the reflectors are relaxed with respect to comparative wavelength selective reflectors.

In an aspect each of the first and second optical reflector is an end face of the said above respective optical fiber connected to the second by-pass port. Preferably the end face is free, i.e. it is not in contact with an index-matching element (such as a liquid or an optical material), e.g. a glass/air interface is present at the end face. Preferably the end face lies on a plane (substantially, i.e. within an angle tolerance of)+/−5° perpendicular to the fiber axis. In this way the reflectors are advantageously realized in a simple and cost effective manner. It is noted that typically the prior art free end face of the fiber (just in front of the photodetector, see below) is inclined with respect to the perpendicular of at least 10°.

In an aspect, the optical by-pass path comprises an optical filter having an attenuation over the entire WDM band greater than or equal to 25 dB (in power), more preferably greater than or equal to 30 dB. Typically the attenuation is substantially constant (e.g. less than 1 dB variation) along the whole WDM band.

In an aspect, the sum, in dB, of the attenuation of the optical filter at the first and second OTDR wavelengths and of the optical power ratio of the optical radiation incident to each optical reflector to the radiation reflected thereby at the first and second OTDR wavelengths (i.e. the negative of the above defined optical power ratio of the optical radiation reflected by each optical reflector to the radiation incident thereto) is greater than or equal to 10 dB, preferably greater than or equal to 12 dB, and/or less than or equal to 20 dB, preferably less than or equal to 18 dB. The Applicant has found that the above ranges of the above defined sum represent a good trade-off between the opposing needs of having a high dynamic range for the back-reflected OTDR signal(s) and avoiding the onset of the resonant cavity effect for the OTDR signal(s).

The Applicant considers that the combination of the above wavelength selective optical filter along the bypass path and the above optical reflectors, while mitigating the signal to signal interference, allows a sufficient dynamic range of the OTDR signals back-reflected by the (localized) reflectors even in case of a relatively low power (i.e. not higher than the power of the WDM channels) of the OTDR signal input to the amplifiers. This in turns allows in-service monitoring of the output optical power of the amplifiers. In addition, depending on the optical power of the OTDR signal input to the amplifiers, the loss along the line optical fiber, the reflection ratio and the filter attenuation, the Applicant thinks that the above combination may also allow the ODTR monitoring of the optical integrity of the optical lines comprised in the link (by receiving and processing the respective OTDR back-scattered traces), possibly in-service and possibly simultaneously with the (in-service) monitoring of the output optical power of the amplifiers.

In an aspect, the optical filter has an attenuation at the first and second OTDR wavelengths less than or equal to 5 dB (in power), preferably less than or equal to 3 dB (e.g. 1 dB or less).

According to the Applicant this provides sufficient dynamic range to the OTDR signals reflected back by the optical reflectors even in presence of low power of the incident OTDR signals (thus allowing in-service monitoring of the amplifier performance) while the back-scattered WDM signal is sufficiently attenuated through the by-pass.

In an aspect, the optical filter is a multi-layer interferential filter.

In an aspect, a first and a second photodetector are optically connected to respectively the first and second optical reflector at the opposite side thereof with respect to the first and second optical coupler, respectively. Preferably the photodetectors are configured for detecting the optical power of the WDM signal outputting the respective optical amplifier. Preferably the end face said above of the respective optical fiber faces directly (i.e. without intervening optical elements) the respective photodetector.

In an aspect, the present invention relates to a system for OTDR monitoring an (bi-directional) optical communication link, the system comprising:

the (bi-directional) optical communication link comprising a plurality of the optical amplification stages according to any aspect of the present invention optically connected in cascade by a plurality of first and second optical fiber spans interleaved respectively with said first and second optical signal paths of the plurality of optical amplification stages, the first optical fiber spans and the first optical signal paths forming together a first optical line, comprised within the (bi-directional) optical communication link, having the first direction of propagation and the second optical fiber spans and the second optical signal paths forming together a second optical line, comprised within the (bi-directional) optical communication link, having the second direction of propagation, the first and second optical line spanning together side-by-side;

a first OTDR apparatus placed at a first end of the (bi-directional) optical communication link and optically coupled to the first and second optical line, the first OTDR apparatus being structured for generating and launching a first OTDR signal having the first ODTR wavelength into the first optical line with the first direction of propagation; for detecting and processing a first OTDR back-reflected signal coming from the second optical line with the second direction of propagation, the first OTDR back-reflected signal being generated from the first OTDR signal by the first optical reflector of at least one of, preferably all, the optical amplification stages, and for deriving from the detected first OTDR back-reflected signal information on the operation (preferably on the output power) of at least one of (preferably all) the first optical amplifiers along the first optical line.

In an aspect the system comprises a second OTDR apparatus placed at a second end of the (bi-directional) optical communication link, opposite said first end, and optically coupled to the first and second optical line, the second OTDR apparatus being structured for generating and launching a second OTDR signal having the second ODTR wavelength into the second optical line with the second direction of propagation; for detecting and processing a respective second OTDR back-reflected signal coming from the first optical line with the first direction of propagation, the second OTDR back-reflected signal being generated from the second OTDR signal by the second optical reflector of at least one of, preferably all, the optical amplification stages, and for deriving from the detected second OTDR back-reflected signal information on the operation (preferably on the output power) of at least one of (preferably all) the second optical amplifiers along the second optical line.

In an aspect, the first and/or second OTDR apparatus is/are also structured for detecting and processing a respective OTDR back-scattered trace coming from respectively the second and first optical line with the second and first direction of propagation, said OTDR back-scattered trace being generated by respectively the first and second optical line by distributed back-scattering of the first and/or, respectively, the second OTDR signal, and for deriving from the detected OTDR back-scattered trace information on the optical integrity of the first and/or second optical line.

In an aspect, each of the OTDR apparatus is structured for coherently detecting the respective OTDR back-reflected signal and/or the respective OTDR back-scattered trace.

In an aspect, the present invention relates to a WDM optical communication system comprising the above system for OTDR monitoring an (bi-directional) optical communication link and further comprising at the first and second end of the (bi-directional) optical communication link respectively a first and a second WDM transmitter structured for generating and launching into the first and second optical line with the first and second direction of propagation respectively, the respective first and second optical (WDM) signal, and comprising at the second and first end respectively a first and a second WDM receiver structured for receiving and processing the respective first and second optical (WDM) signal coming from respectively the first and second optical line.

In an aspect the WDM optical communication system comprises a plurality of the above system for OTDR monitoring a (bi-directional) optical communication link, the plurality of first and second optical fiber spans being enclosed in a single optical fiber cable spanning from one optical amplification stage to the next one.

In a further aspect, the present invention relates to a method for OTDR monitoring a (bi-directional) optical communication link comprising a plurality of the optical amplification stages according to any aspect of the present invention, optically connected in cascade by a plurality of first and second optical fiber spans interleaved respectively with said first and second optical signal paths of the plurality of optical amplification stages, the first optical fiber spans and the first optical signal paths forming together a first optical line within the (bi-directional) optical communication link having the first direction of propagation and the second optical fiber spans and the second optical signal paths funning together a second optical line having the second direction of propagation, the method comprising:

at a first end of the optical communication link, generating a first OTDR signal having the first ODTR wavelength and launching it into the first optical line with the first direction of propagation;

at at least one, preferably at each, optical amplification stage, generating a first OTDR back-reflected signal by back-reflecting at the respective first optical reflector a portion of the optical power of the first OTDR signal outputting the respective first optical amplifier with the first direction of propagation, and routing the first OTDR back-reflected signal into the respective second optical signal path downstream the respective second optical amplifier with respect to the second direction of propagation, with the second direction of propagation;

at the first end of the optical communication link, detecting and processing the first OTDR back-reflected signal coming from the second optical line with the second direction of propagation and deriving from the detected first OTDR back-reflected signal information on the operation (preferably the output optical power) of the respective first optical amplifier(s) along the first optical line.

In an aspect the method comprises at a second end of the optical communication link, generating a second OTDR signal having the second ODTR wavelength and launching it into the second optical line with the second direction of propagation;

at at least one, preferably at each optical amplification stage, generating a second OTDR back-reflected signal by back-reflecting at the respective second optical reflector a portion of the optical power of the second OTDR signal outputting the respective second optical amplifier with the second direction of propagation, and routing the second OTDR back-reflected signal into the respective first optical signal path downstream the respective first optical amplifier with respect to the first direction of propagation, with the first direction of propagation;

at the second end of the optical communication link, detecting and processing the second OTDR back-reflected signal coming from the first optical line with the first direction of propagation and deriving from the detected second OTDR back-reflected signal information on the operation of the respective second optical amplifier(s) along the second optical line.

In an aspect, the first and/or second OTDR signal are launched together with the first and/or second optical (WDM) signal (in-service).

In an aspect, the method comprises at the first and/or at the second end detecting and processing a respective OTDR back-scattered trace coming from respectively the second and/or the first optical line with the second and/or first direction of propagation, said OTDR back-scattered trace being generated by respectively the first and second optical line by distributed back-scattering of the first and/or, respectively, the second OTDR signal, and deriving from the detected OTDR back-scattered trace information on the optical integrity of the first and/or second optical line.

In an aspect, the OTDR back-reflected signal(s) and/or the OTDR back-scattered trace are detected coherently.

Further aspects of the present invention are set forth in the appended claims.

Further characteristics and advantages will be more evident from the detailed description of some exemplary, though not exclusive, embodiments of optical amplification stage, related OTDR monitoring method and system, in accordance with the present invention.

BRIEF DESCRIPTION OF THE DRAWINGS

This description will be disclosed below with reference to the accompanying drawings, provided to a merely indicative and therefore non-limiting purpose, in which:

FIG. 3 shows (not to scale) an exemplar optical power response of the optical filter within the optical amplification stage of FIG. 1.

DETAILED DESCRIPTION OF THE INVENTION

Figure 1:
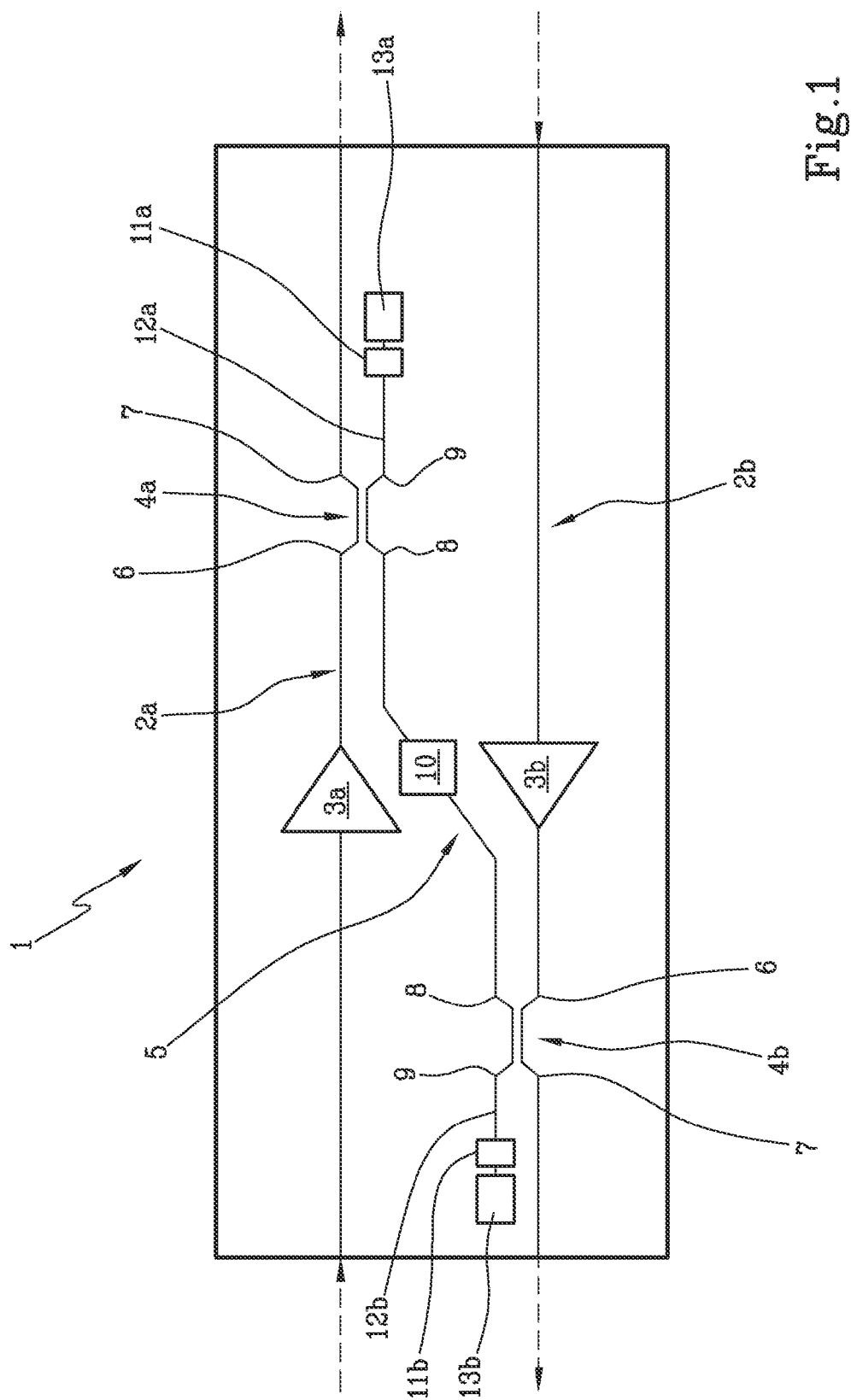
FIG. 1 shows in terms of logical blocks a schematic diagram of an embodiment of the optical amplification stage in accordance with the present invention.

The optical amplification stage 1 for OTDR monitoring of the present invention comprises a first and a second optical signal path 2a, 2b (e.g. mainly composed of optical fibers) having respectively first and second direction of propagation (indicated by the dashed arrows in FIG. 1) of a respective first and second optical signal, the first and second direction of propagation being mutually opposite, and a first and a second optical amplifier 3a, 3b located along the first and second optical signal path respectively and having an optical amplification band, typically equal for the two amplifiers.

Typically each of the first and second optical signal is a WDM signal comprising a plurality of optical signal channels having center wavelengths distributed on a grid equally spaced in frequency by a WDM spacing (e.g. equal to 100 GHz or 50 GHz), the WDM signal occupying a WDM band comprised within the amplification band. Exemplarily, the width of the (single spectrally continuous) WDM band is about 30 nm, spanning from 1530 nm to 1560 nm, and the width of the amplification band is at least 36 nm, spanning at least from 1527 nm to 1563 nm (see e.g. FIG. 3).

The optical amplification stage comprises a first optical coupler 4a placed along the first optical signal path 2a downstream the first optical amplifier 3a with respect to the first direction of propagation, a second optical coupler 4b placed along the second optical signal path 2b downstream the second optical amplifier 3b with respect to the second direction of propagation and an optical by-pass path 5 optically connecting the first and the second optical coupler.

Conventionally each coupler has a first 6 and second signal port 7 belonging to the respective optical signal path, the first port facing the respective amplifier, and a first 8 and second by-pass port 9, the first by-pass port belonging to the optical by-pass path, wherein the first by-pass port 8 is the cross-port with respect to the second signal port 7. Preferably the optical couplers are directional optical couplers (such as those schematically depicted in FIG. 1) each one formed by a pair of optical fiber segments closely spaced together.

Exemplarily, the ratio of the optical power inputting each port of each coupler to the optical power outputting the respective cross port (e.g. from first signal port 6 to second by-pass port 9 or from second signal port 7 to first by-pass port 8) over the whole WDM band, typically over the whole amplification band, is 10 dB and the ratio of the optical power inputting each port of each coupler to the optical power outputting the respective thru-port (e.g. from first signal port 6 to second signal port 7 or from second by-pass port 9 to first by-pass port 8) is equal to 0.5 dB (90/10 power splitting ratio), throughout the whole amplification band.

The optical amplification stage 1 comprises a first 11a and a second optical reflector 11b optically connected to the second by-pass port 9 of respectively the first 4a and second optical coupler 4b. Preferably the first and second reflector 11a, 11b are placed on a respective optical fiber 12a, 12b connected, preferably directly, i.e. without intervening couplers and/or other optical devices, to the second by-pass port 9 of the respective optical coupler. Preferably each of the first and second optical reflector 11a, 11b is a free end face of the respective optical fiber 12a, 12b. Preferably the end face (just in front of the photodetector, see below) is cut perpendicular to the fiber axis. Advantageously the end face of the fiber does not typically need any further processing. However, especially in case it is desirable to increase the reflection ratio, it is possible to deposit thin metallic (e.g. gold) layers on the fiber end. It is also preferable that the end face of the fiber and the input face of the photodetector are not mutually parallel (i.e. the respective normal axes form an angle of at least 10°, preferably at least 20°), in order to avoid multi-reflections between the two faces.

Alternatively, each of the first and second optical reflector may be realized by any different technique, such as in case of Bragg Grating reflectors along the fiber 12a, 12b.

The first and second reflectors are structured so that the optical power ratio of the optical radiation reflected by each optical reflector to the radiation incident thereto is substantially constant over the whole amplification band. Exemplary the above defined optical power ratio is equal to about −14 dB.

However, the present invention also envisages the case wherein the first and second reflectors are wavelength selective in the amplification band, so that the above defined optical power ratio is less than or equal to −20 dB within the whole WDM band and less than or equal to −7 dB and/or greater than or equal to −20 dB (e.g. about −14 dB) at the first and second OTDR wavelengths, respectively. The optical by-pass path comprises an optical filter 10 (e.g. a multi-layer interferential filter) exemplarily having an attenuation equal to about 30 dB over the entire WDM band and equal to about 1 dB at the first and second OTDR wavelengths. It is noted that the optical filter of the present invention can be implemented by any technique alternative to the multi-layer interferential technique. In addition, the optical filter 10 may consist in more than one physical device placed along the optical by-pass path, even in a distributed manner.

FIG. 3 shows an exemplary optical power response of the optical filter, in terms of the ratio of the optical power of the transmitted radiation to the optical power of the corresponding incident radiation. It can be seen that the optical filter is structured for transmitting only in a transmission band 30 comprising a first and a second OTDR wavelength, OTDR1 and OTDR2 (e.g. respectively equal to 1528 nm and 1562 nm), comprised within the amplification band 33 (depicted by way of illustration only in FIG. 3). Exemplarily the first and second OTDR wavelengths are on the grid and outside the WDM band 32 (exemplarily spanning from 1530 nm to 1560 nm) at opposite sides thereof, being placed at about 2 nm from the nearest edge of the WDM band (i.e. either 1530 nm or 1560 nm). It is noted that FIG. 3 shows only a portion of the transmission band 30 of the optical filter (conventionally defined as ending/starting at the wavelength wherein the power response drops to below about −25 dB), which is the nearest one to the WDM band.

Exemplarily, the optical power ratio of the optical radiation transmitted by the optical filter 10 to the radiation incident thereto is about −1 dB at the first and second OTDR wavelength and about −30 dB throughout the whole WDM band.

Preferably, a first and a second photodetector 13a, 13b are optically connected to respectively the first and second optical reflector 11a, 11b at the opposite side thereof with respect to the first and second optical coupler 4a, 4b, respectively. Preferably the photodetectors are configured for detecting the optical power of the WDM signal outputting the respective optical amplifier, e.g. as known in the art.

Figure 2:
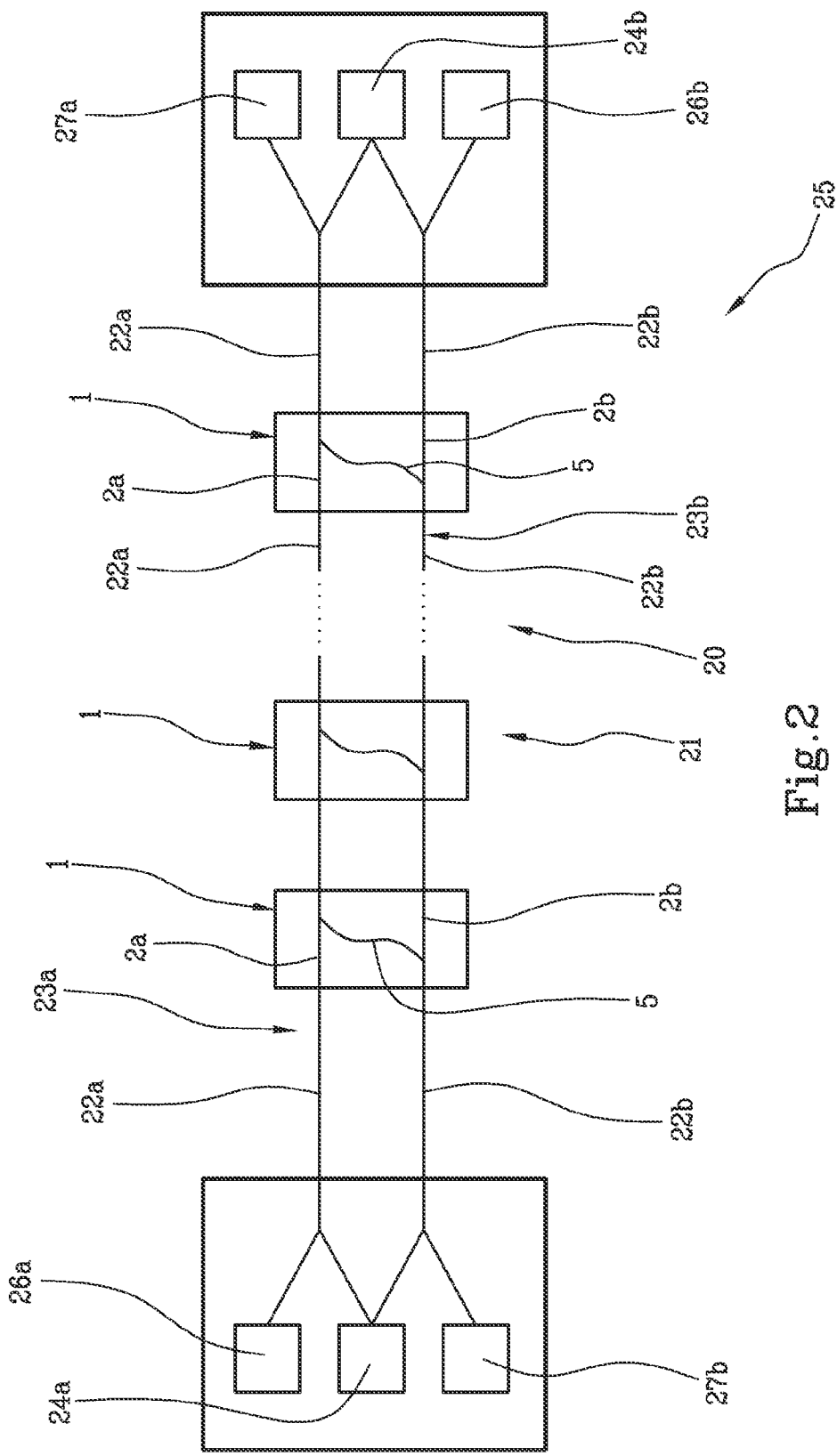
FIG. 2 shows in terms of logical blocks a schematic diagram of an optical communication system comprising the amplification stages in accordance with the present invention.

FIG. 2 exemplarily shows a system 20 for OTDR monitoring a bi-directional optical communication link 21, the system 20 comprising the bi-directional optical communication link 21 comprising a plurality of the optical amplification stages 1 (only partially depicted in FIG. 2) optically connected in cascade by a plurality of first and second optical fiber spans 22a, 22b interleaved respectively with said first and second optical signal paths 2a, 2b of the plurality of optical amplification stages, the first optical fiber spans and the first optical signal paths forming together a first optical line 23a, comprised within the bi-directional optical communication link, having the first direction of propagation and the second optical fiber spans and the second optical signal paths limning together a second optical line 23b, comprised within the bi-directional optical communication link, having the second direction of propagation, the first and second optical line 23a, 23b spanning together side-by-side.

The system 20 further comprises a first OTDR apparatus 24a placed at a first end (e.g. on the left in FIG. 2) of the bi-directional optical communication link and optically coupled to the first and second optical line, the first OTDR apparatus being structured for generating and launching a first OTDR signal having the first ODTR wavelength into the first optical line 23a with the first direction of propagation; for detecting and processing a first OTDR back-reflected signal coming from the second optical line 23b with the second direction of propagation, the first OTDR back-reflected signal being generated from the first OTDR signal by the first optical reflector 11a of at least one of, preferably all, the optical amplification stages 1, and for deriving from the detected first OTDR back-reflected signal information on the operation (preferably on the output power) of at least one of (preferably all) the first optical amplifiers 3a along the first optical line.

Preferably the system further comprises a second OTDR apparatus 24b placed at a second end (e.g. on the right in FIG. 2) of the bi-directional optical communication link, opposite said first end, and optically coupled to the first and second optical line, the second OTDR apparatus being structured for generating and launching a second OTDR signal having the second ODTR wavelength into the second optical line with the second direction of propagation; for detecting and processing a respective second OTDR back-reflected signal coming from the first optical line with the first direction of propagation, the second OTDR back-reflected signal being generated from the second OTDR signal by the second optical reflector 11b of at least one of, preferably all, the optical amplification stages 1, and for deriving from the detected second OTDR back-reflected signal information on the operation (preferably on the output power) of at least one of (preferably all) the second optical amplifiers along the second optical line. Preferably, the first and second OTDR apparatus are also structured for detecting and processing a respective OTDR back-scattered trace coming from respectively the second and first optical line with the second and first direction of propagation, said OTDR back-scattered trace being generated by respectively the first and second optical line by distributed back-scattering of the first and/or, respectively, the second OTDR signal, respectively, and for deriving from the detected OTDR back-scattered trace information on the optical integrity of the first and/or second optical line.

Preferably, each of the OTDR apparatus is structured for coherently detecting the respective OTDR back-reflected signal and/or the respective OTDR back-scattered trace. FIG. 2 schematically shows also a WDM optical communication system 25 comprising the system 20 for OTDR monitoring the bi-directional optical communication link and further comprising at the first and second end of the bi-directional optical communication link respectively a first 26a and a second WDM transmitter 26b structured for generating and launching into the first and second optical line with the first and second direction of propagation respectively, the respective WDM signal, and comprising at the second and first end respectively a first 27a and a second WDM receiver 27b structured for receiving and processing the respective WDM signal coming from respectively the first and second optical line.

Preferably the WDM optical communication system 25 comprises a plurality (not shown) of the above systems 20 for OTDR monitoring a bi-directional optical communication link, the plurality of first and second optical fiber spans being enclosed in a single optical fiber cable (not shown) spanning from one optical amplification stage to the next one.

An exemplary method for OTDR monitoring the bi-directional optical communication link 21 based on the above system 20 will be described here below.

The method comprises at the first end of the optical communication link, generating a first OTDR signal having the first ODTR wavelength and launching it (preferably in-service) into the first optical line 23a with the first direction of propagation.

Subsequently, at at least one, preferably at each, optical amplification stage 1, the method comprises generating a first OTDR back-reflected signal by back-reflecting at the respective first optical reflector 11a a portion of the optical power of the first OTDR signal outputting the respective first optical amplifier 3a with the first direction of propagation, and routing the first OTDR back-reflected signal into the second optical signal path 2b downstream the second optical amplifier with respect to the second direction of propagation, with the second direction of propagation.

Still subsequently, the method further comprises at the first end of the optical communication link, detecting (preferably coherently) and processing the first OTDR back-reflected signal coming from the second optical line 23b with the second direction of propagation and deriving from the detected first OTDR back-reflected signal information on the operation (preferably the output optical power) of the respective first optical amplifier(s) along the first optical line.

Preferably, the method comprises at the second end of the optical communication link, generating a second OTDR signal having the second ODTR wavelength and launching it (preferably in-service) into the second optical line 23b with the second direction of propagation; at each optical amplification stage, generating a second OTDR back-reflected signal by back reflecting at the respective second optical reflector 11b a portion of the optical power of the second OTDR signal outputting the respective second optical amplifier 3b with the second direction of propagation, and routing the second OTDR back-reflected signal into the respective first optical signal path 2a downstream the respective first optical amplifier 3a with respect to the first direction of propagation, with the first direction of propagation; at the second end of the optical communication link, detecting (preferably coherently) and processing the second OTDR back-reflected signal coming from the first optical line 23a with the first direction of propagation and deriving from the detected second OTDR back-reflected signal information on the operation of the respective second optical amplifier(s) along the second optical line.

Preferably, the method comprises at the first and/or at the second end detecting (preferably coherently) and processing the respective OTDR back-scattered trace coming from respectively the second and/or the first optical line with the second and/or first direction of propagation and deriving from the detected OTDR back-scattered trace information on the optical integrity of the first and/or second optical line.

The amplifiers 3a, 3b can be implemented with conventional technology, such as erbium doped fiber amplifiers (EDFAs) or other rare earth doped fiber amplifiers, Raman amplifiers or semiconductor optical amplifiers. In addition, they can be based on single-stage architecture as well as dual-stage architecture (here the term 'stage' has a different meaning from that used above and in the claims). For purposes of simplicity, the amplifiers depicted in FIG. 2 have been abstracted. In practice, the amplifiers can be implemented as typically done using, for example, an erbium doped fiber and laser pump configuration. In addition and with reference to dual-stage architectures, other componentry that operatively couple amplifiers, such as noise filtering (e.g., ASE filter), isolators, and gain flattening filters, are not shown, but can be implemented as typically done. It is to be noted that the "output" of an amplifier generally refers to the output of the amplifier itself for single-stage embodiments, or the output of the second stage amplifier for dual-stage embodiments. Likewise, the "input" of an amplifier generally refers to the input of the amplifier itself for single-stage embodiments, or the input of the first stage amplifier for dual-stage embodiments.

In addition, the term "optically connected" as used herein refers to any connection, coupling, link or the like by which optical signals carried by one system element are imparted to the "connected" element or elements. Unless otherwise stated, such "connected" devices are not necessarily directly connected to one another and may be separated by intermediate components or devices that may manipulate or modify such signals.

The invention claimed is:

1. Optical amplification stage for OTDR monitoring, the optical amplification stage comprising
   a first and a second optical signal path having respectively first and second direction of propagation of a respective first and second optical signal, the first and second direction of propagation being mutually opposite,
   a first and a second optical amplifier located along the first and second optical signal path respectively and having an optical amplification band, each of the first and second optical signal being a WDM signal occupying a WDM band comprised within the optical amplification band,
   a first optical coupler placed along the first optical signal path downstream the first optical amplifier with respect to the first direction of propagation,
   a second optical coupler placed along the second optical signal path downstream the second optical amplifier with respect to the second direction of propagation and
   an optical by-pass path optically connecting the first and the second optical coupler, each coupler having
      a first and a second signal port belonging to the respective optical signal path, the first port facing the respective optical amplifier, and
      a first and second by-pass port, the first by-pass port belonging to the optical by-pass path, wherein the first by-pass port is the cross-port with respect to the second signal port,
   the optical amplification stage further comprising
      a first and a second optical reflector optically connected to the second by-pass port of respectively the first and second optical coupler, and
      an optical filter placed along the optical by-pass path and having an attenuation greater than or equal to 25 dB over the entire WDM band, wherein the first and second reflector and the optical filter are structured so that the sum, in dB, of the attenuation of the optical filter at a first and second OTDR wavelengths, comprised within the amplification band and outside the WDM band, and of the optical power ratio of the optical radiation incident to each optical reflector to the radiation reflected thereby at the first and second OTDR wavelengths, is less than or equal to 20 dB.

2. The optical amplification stage according to claim 1, wherein said sum is greater than or equal to 10 dB.

3. The optical amplification stage according to claim 1, wherein the first and second reflector are structured so that the optical power ratio of the optical radiation reflected by each optical reflector to the radiation incident thereto at least at the first and second OTDR wavelength is less than or equal to −7 dB, and/or greater than or equal to −20 dB.

4. The optical amplification stage according to claim 1, wherein the optical filter has an attenuation at the first and second OTDR wavelengths less than or equal to 5 dB.

5. The optical amplification stage according to claim 1, wherein the first and second reflectors are structured so that the optical power ratio of the optical radiation reflected by each optical reflector to the radiation incident thereto is substantially constant over the whole WDM band.

6. The optical amplification stage according to claim 1, wherein the optical filter is a multi-layer interferential filter.

7. The optical amplification stage according to claim 1, wherein the first and second reflector are placed on a respective optical fiber connected directly to the second by-pass port of the respective optical coupler.

8. The optical amplification stage according to claim 1, wherein each of the first and second optical reflector is an end face of a respective optical fiber connected to the second by-pass port of the respective optical coupler.

9. The optical amplification stage according to claim 8 wherein said end face is free and lies on a plane substantially perpendicular to a longitudinal axis of said respective optical fiber.

10. The optical amplification stage according to claim 1, further comprising a first and a second photodetector optically connected to respectively the first and second optical reflector at the opposite side thereof with respect to the first and second optical coupler, respectively, the photodetectors being configured for detecting the optical power of the WDM signal outputting the respective optical amplifier.

11. System for OTDR monitoring an optical communication link, the system comprising:
the optical communication link comprising a plurality of optical amplification stages each one according to claim 1, the optical amplification stages being optically connected in cascade by a plurality of first and second optical fiber spans interleaved respectively with said first and second optical signal paths of the plurality of optical amplification stages, the first optical fiber spans and the first optical signal paths forming together a first optical line, comprised within the optical communication link, having the first direction of propagation and the second optical fiber spans and the second optical signal paths forming together a second optical line, comprised within the optical communication link, having the second direction of propagation, the first and second optical line spanning together side-by-side;
a first OTDR apparatus placed at a first end of the optical communication link and optically coupled to the first and second optical line, the first OTDR apparatus being structured for generating and launching a first OTDR signal having a first ODTR wavelength into the first optical line with the first direction of propagation; for detecting and processing a first OTDR back-reflected signal coming from the second optical line with the second direction of propagation, the first OTDR back-reflected signal being generated from the first OTDR signal by the first optical reflector of at least one of the optical amplification stages, and for deriving from the detected first OTDR back-reflected signal information on the operation of at least one of the first optical amplifiers along the first optical line.

12. A WDM optical communication system comprising the system for OTDR monitoring an optical communication link according to claim 11, and further comprising at the first and second end of the optical communication link respectively a first and a second WDM transmitter structured for generating and launching into the first and second optical line with the first and second direction of propagation respectively, the respective WDM signal, and comprising at the second and first end respectively a first and a second WDM receiver structured for receiving and processing the respective WDM signal coming from respectively the first and second optical line.

13. A method for OTDR monitoring an optical communication link comprising a plurality of optical amplification stages for OTDR monitoring,
each optical amplification stage comprising
a first and a second optical signal path having respectively first and second direction of propagation of a respective first and second optical signal, the first and second direction of propagation being mutually opposite,
a first and a second optical amplifier located along the first and second optical signal path respectively and having an optical amplification band,
each of the first and second optical signal being a WDM signal occupying a WDM band comprised within the optical amplification band,
a first optical coupler placed along the first optical signal path downstream the first optical amplifier with respect to the first direction of propagation,
a second optical coupler placed along the second optical signal path downstream the second optical amplifier with respect to the second direction of propagation and
an optical by-pass path optically connecting the first and the second optical coupler,
each coupler having
a first and a second signal port belonging to the respective optical signal path, the first port facing the respective optical amplifier, and
a first and a second by-pass port, the first by-pass port belonging to the optical by-pass path, wherein the first by-pass port is the cross-port with respect to the second signal port,
said each optical amplification stage further comprising
a first and a second optical reflector optically connected to the second by-pass port of respectively the first and second optical coupler, and
an optical filter placed along the optical by-pass path an having an attenuation greater than or equal to 25 dB over the entire WDM band, wherein the first and second reflector and the optical filter are structured so that the sum of the attenuation of the optical filter at a first and second OTDR wavelengths, comprised within the amplification band and outside the WDM band, and of the optical power ratio of the optical radiation incident to each optical reflector to the radiation reflected thereby at the first and second OTDR wavelengths, is less than or equal to 20 dB,
the optical amplification stages being optically connected in cascade by a plurality of first and second optical fiber spans interleaved respectively with said first and second optical signal paths of the plurality of optical amplification stages, the first optical fiber spans and the first optical signal paths forming together a first optical line within the optical communication link having the first direction of propagation and the second optical fiber spans and the second optical signal paths forming together a second optical line having the second direction of propagation, the method comprising:
at a first end of the optical communication link, generating a first OTDR signal having a first ODTR wavelength and launching it into the first optical line with the first direction of propagation;

at at least one optical amplification stage, generating a first OTDR back-reflected signal by back-reflecting at the respective first optical reflector a portion of the optical power of the first OTDR signal outputting the respective first optical amplifier with the first direction of propagation, and routing the first OTDR back-reflected signal into the respective second optical signal path downstream the respective second optical amplifier with respect to the second direction of propagation, with the second direction of propagation;

at the first end of the optical communication link, detecting and processing the first OTDR back-reflected signal coming from the second optical line with the second direction of propagation and deriving from the detected first OTDR back-reflected signal information on the operation of the respective first optical amplifier, preferably first optical amplifiers, along the first optical line.

14. The method according to claim 13, comprising at a second end of the optical communication link, generating a second OTDR signal having a second ODTR wavelength and launching it into the second optical line with the second direction of propagation;

at at least one optical amplification stage, generating a second OTDR back-reflected signal by back-reflecting at the respective second optical reflector a portion of the optical power of the second OTDR signal outputting the respective second optical amplifier with the second direction of propagation, and routing the second OTDR back-reflected signal into the respective first optical signal path downstream the respective first optical amplifier with respect to the first direction of propagation, with the first direction of propagation;

at the second end of the optical communication link, detecting and processing the second OTDR back-reflected signal coming from the first optical line with the first direction of propagation and deriving from the detected second OTDR back-reflected signal information on the operation of the respective second optical amplifier along the second optical line, the first and second OTDR wavelengths being mutually placed apart by at least 200 GHz.

15. The method according to claim 13, comprising at the first end and/or at the second end detecting and processing a respective OTDR back-scattered trace coming from respectively the second and/or the first optical line with the second and/or first direction of propagation, said OTDR back-scattered trace being generated by respectively the first and second optical line by distributed back-scattering of the first and/or, respectively, the second OTDR signal, and deriving from the detected OTDR back-scattered trace information on the optical integrity of the first and/or second optical line.

16. The optical amplification stage according to claim 1, wherein the attenuation of the optical filter is greater than or equal to 30 dB over the entire WDM band.

* * * * *

UNITED STATES PATENT AND TRADEMARK OFFICE
CERTIFICATE OF CORRECTION

| | | |
|---|---|---|
| PATENT NO. | : 9,124,362 B2 | Page 1 of 1 |
| APPLICATION NO. | : 14/049866 | |
| DATED | : September 1, 2015 | |
| INVENTOR(S) | : Giorgio Grasso et al. | |

It is certified that error appears in the above-identified patent and that said Letters Patent is hereby corrected as shown below:

In the Claims:
At Column 15 lines 16-17, in Claim 13, please delete ", preferably first optical amplifiers,".

Signed and Sealed this
Nineteenth Day of January, 2016

Michelle K. Lee
*Director of the United States Patent and Trademark Office*